United States Patent

[11] 3,558,928

[72] Inventors Claude Remy
21 Allee Circulaire, Foret de Vernon par 27, Vernon;
Claude Lejannou, 2 rue d'Archimede Le Val Foure 78, Mantes-La-Jolie; Jacques Leclere, 39 Allee des Penitents Foret de Vernon par 27, Vernon, France

[21] Appl. No. 773,444
[22] Filed Nov. 5, 1968
[45] Patented Jan. 26, 1971
[32] Priority Nov. 8, 1967
[33] France
[31] 127,374

[54] CIRCUIT FOR MULTIPLYING TWO ELECTRICAL MAGNITUDES
5 Claims, 4 Drawing Figs.

[52] U.S. Cl. ........ 307/265, 307/229, 307/240; 328/160
[51] Int. Cl. ........ H03k 1/18, G06g 7/16
[50] Field of Search ........ 328/160, 161, 158, 58; 235/194, 195; 324/142; 307/240, 234, 235, 265, 229

[56] References Cited

UNITED STATES PATENTS

| | | | |
|---|---|---|---|
| 3,393,307 | 7/1968 | Courtenay et al. ........ | 235/194 |
| 3,363,188 | 1/1968 | Gardee ........ | 328/160 |

*Primary Examiner*—Donald D. Forrer
*Assistant Examiner*—B. P. Davis
*Attorney* —Robert E. Burns and Emmanuel J. Lobato

ABSTRACT: A circuit for multiplying two electrical magnitudes, which comprises a time modulator receiving at its first input a signal corresponding to a first electrical magnitude, a monitoring oscillator producing short synchronizing pulses which is connected to the other input of said time modulator in order to produce periodic signals at the output of said time modulator, said periodic signals being delivered at the oscillator rate and having a duration proportional to the value of the first electrical magnitude, and an output stage comprising two chopper transistors, as well as an adder circuit adapted to deliver at its output a signal having a duration and an amplitude proportional to the first and second electrical magnitudes, respectively.

PATENTED JAN 26 1971

3,558,928

SHEET 2 OF 3

CIRCUIT FOR MULTIPLYING TWO ELECTRICAL MAGNITUDES

BACKGROUND OF THE INVENTION

This invention relates to a circuit capable of multiplying two electrical magnitures.

Various multiplier circuits are already known which are a capable of determining the product of two electrical magnitures. However, all hitherto known multiplier circuits, whether those utilizing the Hall effect, or those utilizing a magnetoresistant element or a field effect transistor, are objectionable on account of their lack of linearity.

SUMMARY OF THE INVENTION

It is the essential object of the present invention to avoid this inconvenience by providing a multiplier circuit characterized by a very good linearity.

To this end, this circuit for multiplying two electrical magnitudes is characterized in that it comprises a time modulator having first and second inputs and receiving at its first input a signal corresponding to a first electrical magnitude, a monitoring oscillator producing short synchronizing pulses which is connected to the other input of said time modulator in order to produce periodic signals at the output of said time modulator, said periodic signals being delivered at the oscillator rate and having a duration proportional to the value of the first electrical magnitude, and an output stage comprising two chopper transistors responsive to the output signal of said time modulator so as to chop alternatively and in a complementary manner two voltages of same value but opposite signs which correspond to the second electrical magnitude, as well as an adder circuit adapted to sum up the voltages chopped by said pair of chopper transistors and to deliver at its output a signal having a duration and an amplitude proportional to the first and second electrical magnitudes, respectively, this last-named signal thus characterizing the product of said two magnitudes.

The multiplier circuit according to this invention is advantageous in that its linearity is greater than 0.1 percent with a time modulation of 5 percent to 95 percent. Within this range, the class of the apparatus according to this invention is $10^{-3}$. Besides, the apparatus remains correct outside these limits and can be operated with a modulation of 0 to 98 percent while remaining practically unsensitive to interferences. In case of input overload, the only consequence is a chopping of the output signal, since the modulation cannot exceed 98 percent.

With supply voltages of + and − 6 volts, the power consumption of the assembly remains lower than 400 milliwatts. All these advantageous features, including its small overall dimensions and its high pass-band, are such that the apparatus according to this invention constitutes a very efficient carrier-suppression modulator, a high-grade wattmeter or even the basic element of a servounit providing the division function.

BRIEF DESCRIPTION OF THE DRAWING

Various forms of embodiment of this invention will now be described by way of example with reference to the accompanying drawings, in which.

DESCRIPTION OF THE PREFERRED EMBODIMENT

Figure 1:
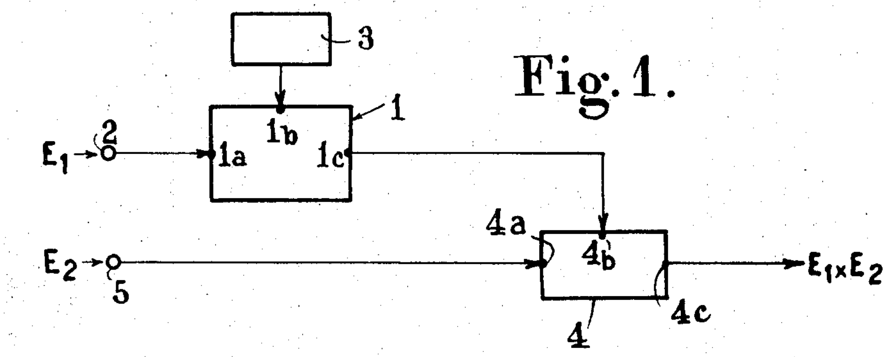
FIG. 1 is a block diagram showing a system for multiplying two electrical magnitudes, according to the principle of the present invention.

The multiplier circuit according to this invention is designed for giving the product of two electrical magnitudes E1 and E2 which may consist of DC voltages, whether positive or negative, or AC voltages. It comprises essentially a time modulator 1 having an input 1*a* connected to a terminal 2 and receiving the signal corresponding to voltage E1, and another input 1*b* having an oscillator 3 connected thereto. The multiplier circuit further comprises an output stage 4 comprising in turn a chopper circuit having an input 4*a;* connected to a terminal 5 receiving the signal corresponding to the other voltage E2, and another input 4*b* connected to the output 1*c* of time modulator 1. As will be seen presently, the chopper circuit of stage 4 deliver at its output 4*c* rectangular or square signal of which the duration and amplitude are proportional to signals E1 and E2 respectively. A simple filter means will subsequently permit of isolating the product E1 times E2 without using any cumbersome reactive element.

Now, the various component elements of the multiplier circuit will be described with reference more specifically to FIG. 2.

In this diagram, the monitoring oscillator 3 comprises two transistors 6, 7 of the PNP type and a transistor 8 of the NPN type connected in cascode. The base of transistor 6 is connected to the junction point of two resistors 9 and 10 connected in series between the positive terminal +V (for example of a 6 volt direct current source) and the earth. The collector of this transistor 6 is connected to the base of transistor 7 and also to the earth through the medium of a resistor 11. Its emitter is connected to the positive terminal +V through a resistor 12. The collector of transistor 7 is connected directly to the base of transistor 8 and earthed through another resistor 13. The emitter of transistor 7 is connected on the one hand to the emitter of transistor 6, through the medium of a capacitor 14, and on the other hand to the positive terminal +V via a resistor 15. The emitter of transistor 8 is earther directly while its collector is connected via a resistor 16 to the positive terminal +V.

The principle component elements of oscillator 3 are the above-mentioned transistors 6 and 7, as transistor 8 simply acts as an element for adapting this circuit to the next circuit consisting of the time modulator 1. An important feature characterizing the oscillator 3 is that the transistors incorporated in this circuit are not operated in a saturated condition, under any circumstances, whereby the oscillator can operate at a relatively high frequency, for example up to 100 kHz. The voltage across the terminals of capacitor 14 has an asymmetric sawtooth waveform. During a cycle, this capacitor is rapidly charged through transistor 7 and resistors 12 and 13. As transistor 7 is then conducting, transistor 8 is also conducting.

On the other hand, during the discharge of capacitor 14, which takes place through resistors 12 and 13, transistor 6 is conducting while the other transistors 7 and 8 are no more conducting. Thus, the change of condition are subordinate to the application or the nonapplication of the discharged current of capacitor 14.

Figure 3:
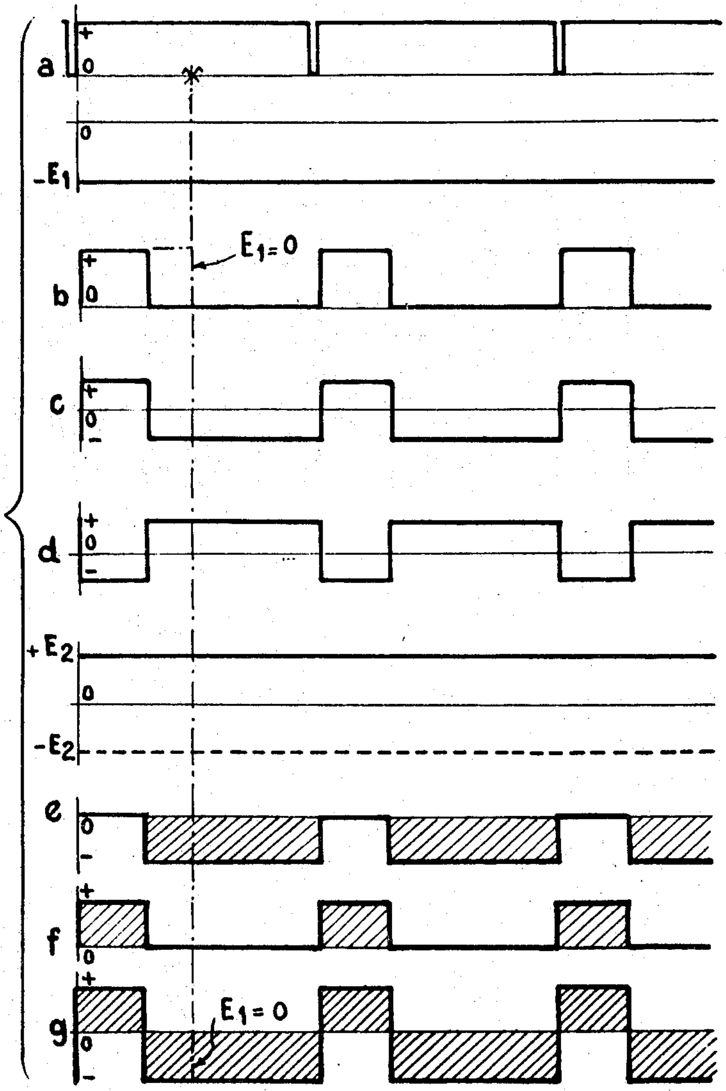
FIG. 3 is wave diagram showing the waveforms of the signals occuring at various points of the multiplier circuit; and, FIG. 4 is a wiring diagram showing another form of embodiment of this invention.

Therefore, the oscillator output, i.e. the collector of transistor 8, delivers narrow negative gating pulses corresponding to about 5 percent of the cycle, which are shown along the line *a* of FIG. 3.

The frequency of these pulses is about 100 kHz. as mentioned hereinabove. This frequency, which must eventually be filtered to isolate the products $\underline{E1 \cdot E2}$ is selected to be as high as possible in order to facilitate the filtration. However, it is relatively low in comparison with the switching capacity of the transistors utilized in the construction of this circuit.

As already explained in the foregoing, the output of oscillator 3 or in other words the collector of transistor 8, is connected to one input of time modulator 1. This modulator 1 comprises five transistors 17, 18, 19, 20 and 21. The base of transistor 17 is connected on the one hand to the positive terminal +V via a resistor 22 and on the other hand to the collector of transistor 8 via a capacitor 23. The emitter of the NPN-type transistor 17 is earthed and its collector connected through a resistor 24 to the terminal 2 to which the first magnitude signal E1 is fed. The collector of transistor 17 is also connected directly to the bases of NPN transistor 18 and PNP transistor 19, and also through another resistor 25 to a positive bias current source 26. The collector of transistor 19 is earthed directly and the collector of transistor 18 is earthed via a capacitor 27 and connected via a resistor 28 to the positive terminal. The emitters of transistors 18 and 19 are connected in common through a capacitor 29 both to the collector of PNP transistor 20 and to the base of NPN transistor 21. The emitter of transistor 20 is connected to the positive terminal +V via a resistor 3 and a Zener diode 32 connected in series across the positive and negative terminals +V and −V. The emitter of transistor 21 is earthed directly and its collector is connected to the positive terminal +V via another resistor 33.

The negative pulses generated by oscillator 3 are fed via capacitor 23 to the base of transistor 17 so that the latter will sample the input voltage fed to terminal 2 at the rate of operation of oscillator 3, i.e. at a frequency of 100 kHz. The sampling time is dependent upon the values of resistor 22 and capacitor 23, and is about 0.2 microsecond.

During the sampling, i.e. when the negative pulse is fed to the base of transistor 7, the latter is blocked, and the capacitor 29 earthed through the medium of the base-emitter diode of transistor 21 is rapidly charged to the sampling voltage of E1 through transistor 18 which is then conducting. When the transistor 17 is no more conducting, at the end of the sampling step, transistor 18 is blocked and transistor 19 becomes conductive to earth capacitor 29. Transistor 21, previously saturated by the collector current of transistor 20, is then blocked by feeding to its base the voltage available across the terminals of capacitor 29 as a consequence of the charge previously accumulated by this capacitor. This condition prevails until the capacitor 29 is discharged by the current injector consisting of transistor 20, resistor 30, Zener diode 32 and resistor 31. As this current is constant, the discharge time of capacitor 29 and therefore the time during which transistor 21 is nonconducting is constantly proportional to the voltage sample E1.

Therefore, a rectangular signal *b* (see FIG. 3) having a frequency of 100 kHz. and a duty cycle proportional to the voltage sample E1, appears on the collector of transistor 21. The voltage from the bias current source 26 is so adjusted that when E1 =0 the duty cycle of signal *b* is 1:2.

This signal *b* is fed via a capacitor 34 to a wave-shaping bistable multivibrator 35 connected across +V and −V and comprising essentially transistors 36 and 37. This multivibrator delivers to the collectors of transistors 36 and 37 a pair of complementary signals *c* and *d* (FIG. 3) having a duty cycle proportional to E1, which signals *c* and *d* are fed to the chopper circuit 4. The signal *c* taken from the collector of transistor 37 is fed directly to the bases of two transistors 38 and 39, the former being of the NPN type and the latter of the PNP type; the emitter-to-collector circuits of these transistors 38 and 39 are connected in series across terminals +V and −V. Similarly, the signal *d* taken from the collector of transistor 36 is fed to the bases of two transistors 40 and 41, the former being of the NPN type and the latter of the PNP type; the emitter-to-collector circuits of these transistors 40 and 41 are connected in series across the terminals +V and −V. The two emitters of transistors 38 and 39, are connected via a resistor 42 and capacitor 43, connected in parallel, to the base of an NPN-type transistor 44, and likewise the two emitters of transistors 40 and 41 are connected via a resistor 45 and a capacitor 46, connected in parallel, to the base of another NPN transistor 47.

The output stage of the multiplier circuit according to this invention comprises two differential amplifiers 48 and 49. The second input of amplifier 48 is earthed via a resistor 50 and the first input thereof is connected to the terminal 5 via another resistor 51. A further resistor 52 is connected between the first input and the output of amplifier 48; the purpose of this amplifier 48, of which the gain is dependent upon the value of resistors 51 and 52 is to adapt the input voltage E2 to a proper operation of the chopper transistors 44 and 47. The output of amplifier 48 is connected via a resistor 53 to the first input of amplifier 49 having its second input earthed through another resistor 54. A complementary resistor 55 connects the output of amplifier 49 to its first input. The gain of amplifier 49 is −1, whereby voltages having the same value but of opposite signs are obtained at the outputs of these amplifiers 48 and 49, these voltages being proportional to voltage E2. The output of amplifier 48 is connected via a pair of series connected resistors 56 and 57 to the output 4*c* of the multiplier circuit, this terminal being also connected to the output of the other amplifier 49 via resistors 58 and 59. The collectors of chopper transistors 44 and 47 are earthed and their emitters are connected to the junction points between resistors 56, 57, on the one hand, and 58, 59, on the other hand, respectively.

The two equal voltages of opposite signs (having the values −E2 and +E2, respectively, assuming that the gain of amplifier 48 is −1) available at the outputs of amplifiers 48 and 49 are chopped alternatively and in a complementary manner by the pair of transistors 44 and 47, this chopping operation yielding the signals shown in lines *e* and *f* of the diagram of FIG. 3, as picked up at the emitters of transistors 44 and 47 respectively.

The output signal of the complete multiplier circuit consists of the algebraic sum of the two signals *e* and *f*, which is formed by the equal resistors 58 and 59. The signal corresponding to the algebraic sum of these two voltages is illustrated in line *g* of FIG. 3.

The mean value of signal *g* is zero with a duty cycle of a time-modulated signal *b* which is equal to 1:2, and remains zero when the input signal E1 is a sine signal, provided that the inoperative condition of the modulator, when said signal E1 is zero, corresponds to said duty cycle 1:2. This condition may be met by properly selecting the voltage value of the bias source 26. As a rule, a signal having a duration proportional to voltage E1 is obtained at the output of the multiplier circuit, the amplitude of this signal being proportional on the other hand to voltage E2. The product $\underline{E1 \cdot E2}$ can be isolated by using simple filter means.

Now reference will be made to FIG. 4 to describe a modified form of embodiment of the multiplier circuit of this invention, this alternate form of embodiment being particularly suitable for designing a modular circuit according to the well-known technique referred to as the "cordwood" circuit technique.

Figure 2:
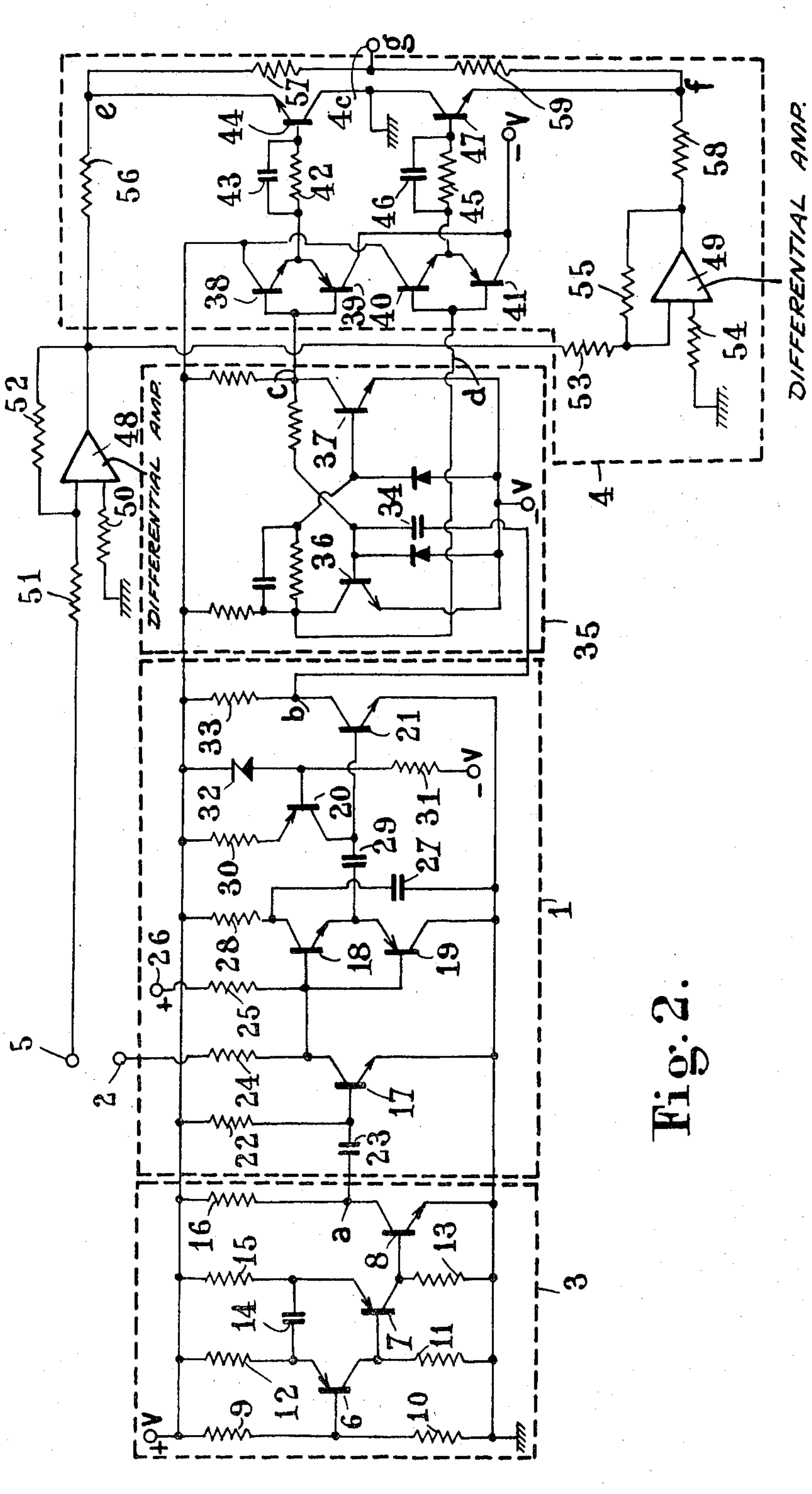
FIG. 2 is a wiring diagram showing a first form of embodiment of the multiplier circuit.
Figure 4:
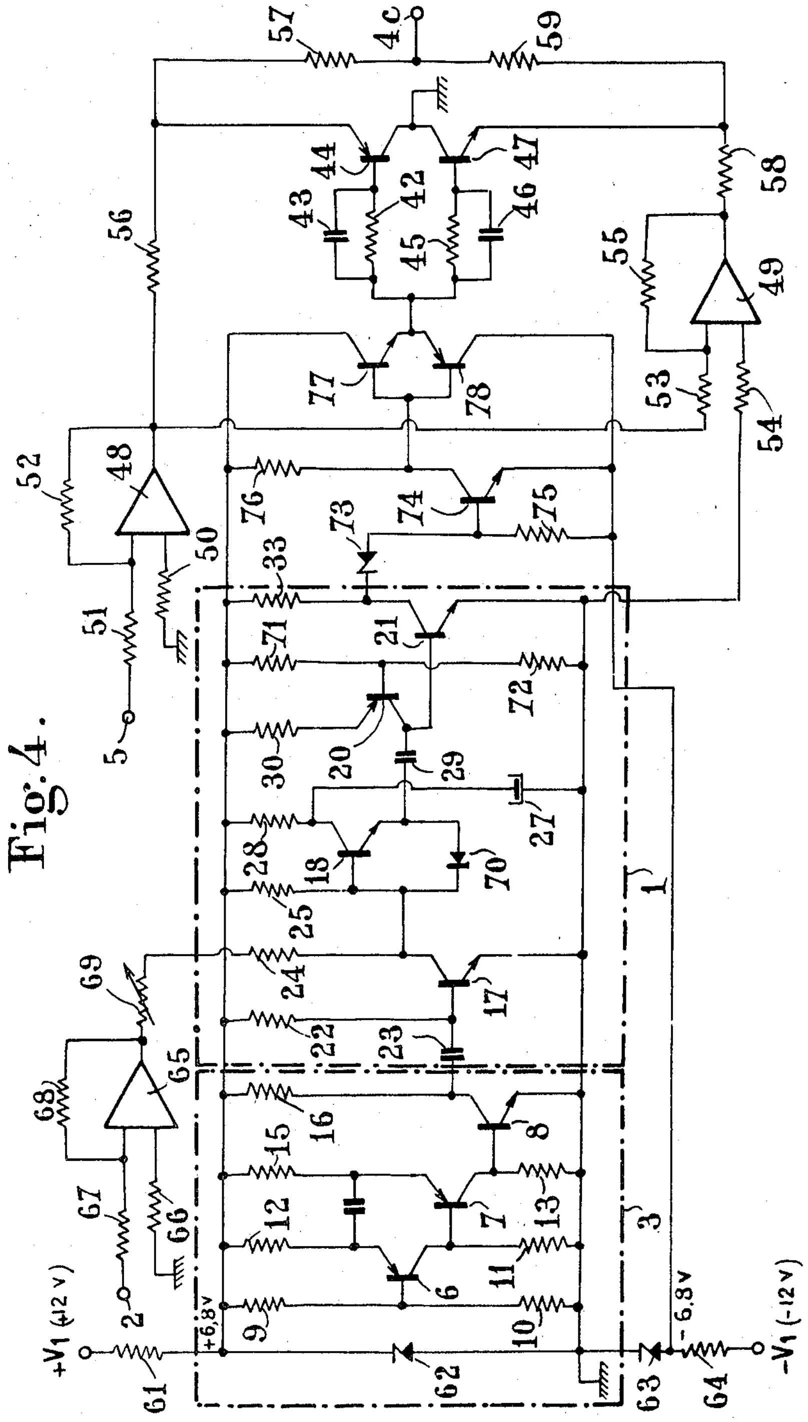

The component elements of the circuit of FIG. 4 which are identical with those of the circuit of FIG. 2 are designated by the same reference numerals.

The multiplier assembly of FIG. 4 comprises a regulated power supply of the Zener diode type, consisting of a resistor 61, two Zener diodes 62 and 63, and a resistor 64 connected in series across the terminals +V1 and −V1 (V1 = 12 volts). The junction point between resistor 61 and Zener diode 62, on the one hand, and the junction point between resistor 64 and Zener diode 63, on the other hand, deliver attenuated voltages corresponding to +6.8 volts and −6.8 volts, respectively, for energizing the various component elements of the multiplier circuit.

The monitoring oscillator 3 is constructed in the same manner as the circuit of FIG. 2.

An amplifier 65 is added to the circuit assembly in order to facilitate the adaptation of the level of input voltage E1 to the proper operation of the sampling transistor 18 and thus facilitate the bias adjustment of this transistor. One input of amplifier 65 is earthed via a resistor 66 and the other input thereof is connected via another resistor 67 to terminal 2 to which the signal E1 is fed. This input is also connected to the output of amplifier 65 via a resistor 68 and this output is connected via a variable resistor 69 to resistor 24.

In the time modular modulator 1 a diode 70 connected between the emitter and base of transistor 18 is substituted for the complementary transistor 19 of the preceding form of embodiment.

This time modulator operates exactly as in the preceding form of embodiment illustrated in FIG. 2. During the sampling operation the capacity 29 earthed via the base-emitter diode of transistor 21 is rapidly charged to the sampling voltage *k*E1, *k* denoting the ratio of the value of resistor 68 so to that of resistor 67 of adaptation amplifier 65. Upon completion of the sampling of voltage E1 by transistor 18, transistor 21 (which was saturated by the collector current of transistor 20) is then blocked by the fact that the voltage hitherto stored across the terminals of capacitor 29 is fed to its base. This condition prevails until capacitor 29 is discharged completely by the current injector consisting of transistor 20, resistor 30 and resistor 71 and 72 connected in series between the +6.8 volt terminal, and the earth, the junction point of these resistors being connected to the base of transistor 20. As this current is constant, the discharge time of capacitor 29 and therefore the blocking time of transistor 21 is constantly proportional to the voltage sample *k E1*

Under these conditions, a rectangular signal having a frequency of 100 kHz. and a duty cycle proportional to the value of voltage E1 appears on the collector of transistor 21.

This collector is connected via a Zener diode 73 to the base of an NPN transistor 74, said base being connected on the other hand to the −6.8 volt terminal via a resistor 75. The emitter of transistor 74 is connected to the −6.8 volt terminal and its collector is connected via a resistor 76 to the +6.8 volt terminal and also to the bases of a pair of complementary transistors 77 and 78 having their collector-emitter circuits connected in series across the +6.8 volt and −6.8 volt terminals.

Thus, the rectangular signal having a frequency of 100 kHz. which appears on the collector of transistor 21 delivers to the interconnected emitters of transistors 77, 78 a signal adapted to control the complementary chopper transistors 44 and 47 having their bases connected to these emitters via resistor and capacitor units 42, 43 and 45, 46.

The use of complementary chopper transistors 44 and 45 permits of reducing to three the number of shaping transistors to only three, instead of the six transistors 36, 37, 38, 39, 40 and 41 in the circuit assembly shown in FIG. 2. The operation of the subassembly is the same as in the case illustrated in FIG. 2, the equal voltages of opposite signs which appears at the outputs of amplifiers 48 and 49 being chopped alternatively and in a complementary manner by transistors 44 and 47.

We claim:

1. A circuit for multiplying two electrical magnitudes, which comprises a time modulator having first and second inputs and receiving at its first input a signal corresponding to a first electrical magnitude, a monitoring oscillator producing short synchronizing pulses which is connected to the other input of said time modulator in order to produce periodic signals at the output of said time modulator, said periodic signals being delivered at the oscillator rate and having a duration proportional to the value of the first electrical magnitude, and an output stage comprising two chopper transistors responsive to the output signal of said time modulator so as to chop alternatively and in a complementary manner two voltages of same value but opposite signs which correspond to the second electrical magnitude, as well as an adder circuit adapted to sum up the voltages chopped by said pair of chopper transistors and to deliver at its output a signal having a duration and an amplitude proportional to the first and second electrical magnitudes, respectively, this last-named signal thus characterizing the product of said two magnitudes.

2. A circuit as set forth in claim 1, wherein said output stage comprises first and second amplifiers having adaptation and symmetrizing properties, which produce at their outputs the two equal voltages of opposite signs which correspond to the second electrical magnitude, and wherein the adder circuit comprises two input terminals and first and second resistors of equal values connected in series across said two input terminals, their junction point constituting the output of said adder circuit, the emitter-collector circuits of said pair of chopper transistors being connected between the earth and the two input terminals of said adder circuit respectively, and third and fourth resistors connected between said two input terminals of said adder circuit and the outputs of said first and second amplifiers, respectively.

3. A circuit as set forth in claim 1, which comprises a waveshaping bistable multivibrator having one input and two outputs, with said input connected to the output of said time modulator and said outputs connected to the bases of said pair of chopper transistors respectively.

4. A circuit as set forth in claim 1, which comprises a third amplifier adapted to receive at its input the signal corresponding to the first electrical magnitude and having its output connected to the first input of said time modulator.

5. A multiplier circuit as set forth in claim 1, which comprises transistors for controlling said pair of chopper transistors and adapting the output signal of said time modulator.